United States Patent [19]

Sloop et al.

[11] Patent Number: 5,632,141
[45] Date of Patent: May 27, 1997

[54] DIFFUSER WITH CONTROLLED DIFFUSED AIR DISCHARGE

[75] Inventors: Robert V. Sloop, Gainesville; R. Edward Bailey, Jr., Palm Beach Gardens, both of Fla.

[73] Assignee: United Technologies Corporation, Hartford, Conn.

[21] Appl. No.: 303,795

[22] Filed: Sep. 9, 1994

[51] Int. Cl.$^6$ .................................................. F02C 6/08
[52] U.S. Cl. ........................... 60/39.02; 60/39.07; 60/751
[58] Field of Search ................... 60/39.07, 39.183, 60/226.1, 751, 39.52, 39.02; 415/144

[56] References Cited

U.S. PATENT DOCUMENTS

| | | | |
|---|---|---|---|
| 2,520,697 | 8/1950 | Smith | 415/144 |
| 3,394,543 | 7/1968 | Slattery | 60/39.07 |
| 3,777,489 | 12/1973 | Johnson et al. | 60/226 |
| 4,796,429 | 1/1989 | Verdouw | 60/39.07 |
| 5,187,931 | 2/1993 | Taylor | 60/39.07 |

FOREIGN PATENT DOCUMENTS 738006  10/1955  United Kingdom ..................... 60/751

*Primary Examiner*—Timothy Thorpe
*Attorney, Agent, or Firm*—Pennie & Edmonds

[57] ABSTRACT

A gas turbine engine diffuser case construction is described that increases the amount of available discharge air for service applications compared to the prior art while reducing downstream component distortion and degradation. The diffuser case has passageways for diffused air that connect a diffused air region to a manifold. At least one orifice is located at the end of each of the passageways in the diffused air region. The size of the orifices controls the amount of air that is discharged from the diffused air region to the manifold. Diffused compressor air collects in the manifold and is then extracted from the manifold as needed for engine or service applications. The size and location of the orifices in the diffuser radially and circumferentially control the rate of discharge of the diffused air from the diffuser before the air enters the combustor region. The ability to influence the flow of air at particular locations around the combustor helps the designer to improve cooling uniformity.

6 Claims, 2 Drawing Sheets

DIFFUSER WITH CONTROLLED DIFFUSED AIR DISCHARGE

TECHNICAL FIELD

This invention relates to gas turbine diffuser cases that provide compressor discharge air for service applications.

BACKGROUND ART

In gas turbine engines, the air leaving a compressor passes between stationary, or stator vanes, then through a diffuser section. The diffuser has an expanding cross sectional area in the direction of the airflow to decrease the velocity and increase the static pressure of the air. This prepares the air for entry into a combustion section at low velocity to permit proper mixing with fuel.

Gas turbine engines generally require that some compressed air be discharged from a diffuser for operation of aircraft or engine accessories.

A typical prior art diffuser is shown in FIG. 1. The diffuser is sometimes referred to as a diffuser case, because it contains and diffuses the compressed air that exits the compressor. The diffuser comprises an outer wail, an inner wail, which diverge in relation to each other, and a plurality of hollow struts that connect the wails in a first diffuser region. Compressed air from a compressor section passes by the struts. The struts each have a strut bleed, or discharge opening, to allow the compressed air to discharge, or be extracted, into the struts. A portion of the compressed air discharges into the strut opening and flows into a manifold that holds and distributes the discharge air for service applications. The discharge air exits through tubing as needed.

This prior art diffuser discharges the compressed air into the struts prior to reaching a second diffuser region downstream of the struts where the compressed air further diffuses. Discharging the compressed air prior to reaching the second, downstream, diffuser region (as in the prior art) provides an adequate amount of discharge air for some applications, however, it fails to maximize the mount of available discharge air. Applications that require a large volume of discharge air may not be satisfied by the prior design.

In the prior art diffuser, the air that passes the struts enters into the second diffuser region and then into a downstream combustor. The airflow into the second diffuser region and combustor is radially interrupted and distorted because of the struts and the strut discharge process. The interruption of the airflow into the combustor causes interrupted cooling of downstream components, such as the combustor and the turbine. Interrupted cooling of the combustor causes some areas of the combustor to be cooled more than others, this results in uneven radial and circumferential thermal growth and distortion, and eventual combustor and downstream turbine degradation.

Some gas turbine applications may require a large volume of available discharge air. One way to increase the volume of available discharge air is by extracting more compressed air by enlarging the discharge openings in the struts. However, larger strut openings have disadvantages, including, decreasing engine efficiency and increasing airflow interruption through the combustor and turbine regions.

A diffuser is shown in U.S. Pat. No. 3,777,489 that has a plenum located in the diffuser case used to aid in the extraction of compressor air from the diffuser case. The diffuser case disclosed therein, however, does not maximize the amount of available discharge air available for service applications.

A diffuser case that increases the amount of available discharge air and reduces combustor distortion is needed.

DISCLOSURE OF INVENTION

It is, therefore, an object of the present invention to provide a diffuser case that increases available discharge air for service applications compared to the prior art while minimizing downstream component distortion and degradation and while increasing efficiency.

According to the present invention, a diffuser case is provided that increases available discharge air for engine service applications by discharging fully diffused air from a second diffused region, the diffuser case comprising means for controlling the rate of discharge of diffused air from the diffuser at specific circumferential locations, before the air enters a combustor region, improving the cooling of downstream engine components.

The diffuser case comprises an outer wail, an inner wall, and struts that connect the outer and inner walls. Inwardly located from the struts is a plenum that accepts diffused compressor air from orifices located radially inward of an annular compressed airflow path. The orifices, the plenum, and the struts define a plurality of first passageways for the flow of diffused air from an inner portion of the diffused airflow through the struts to a manifold. Orifices radially outward of the compressed airflow path connect with the manifold to define a plurality of second diffused air passageways to the manifold for the flow of diffused air from an outer portion of the diffused airflow. A first portion of diffused air flows through the passages and a second portion of diffused air flows by and through the combustor. The amount of available discharge air is efficiently increased, when compared to the prior art, because the air is more diffused and has a higher static pressure prior to being discharged into the orifices, and the outside and inside orifices allow more diffused air to be extracted from the engine. The diffused compressor air is stored in the manifold and is available for service applications.

The inside and outside orifice sizes are preferably sized and located to control, or direct, the diffuser airflow uniformly around the combustor for combustor cooling and may compensate to some degree for strut interruption of the airflow. The size and location of orifices and the airflow that results, radially and circumferentially affect the airflow and the discharge rate of the diffused air before the air enters the combustor region and, therefore, can provide a more uniform flow of cooling air to downstream components than that in the prior art. The controlled discharge of the diffused air improves combustor and turbine cooling uniformity and reduces downstream component distortion when compared to the prior art strut air discharge arrangement.

The foregoing and other features and advantages of the present invention will become more apparent from the following description and accompanying drawings.

BEST MODE FOR CARRYING OUT THE INVENTION

Figure 1:
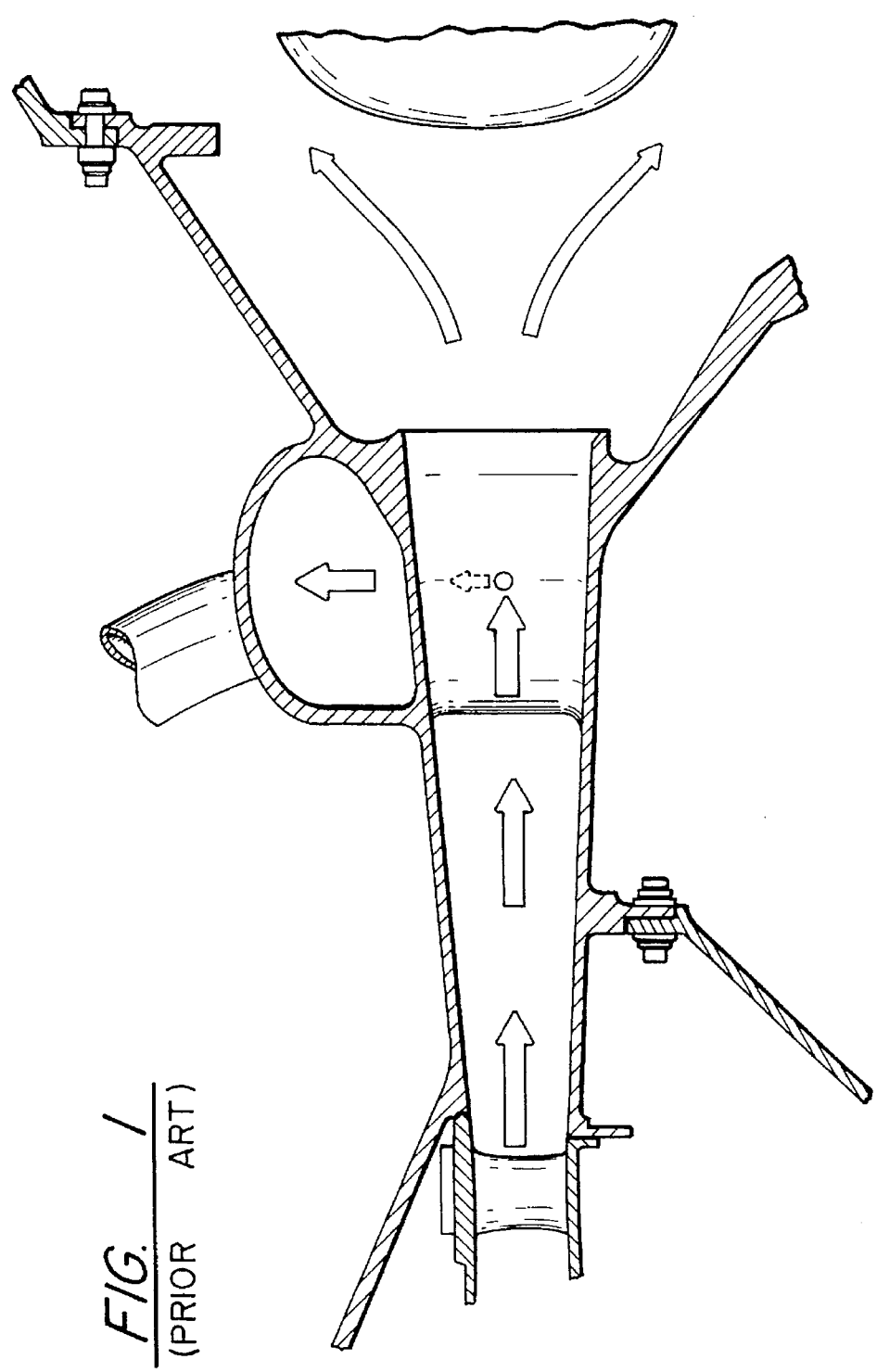
FIG. 1 is a cross section of a prior art diffuser.
Figure 2:
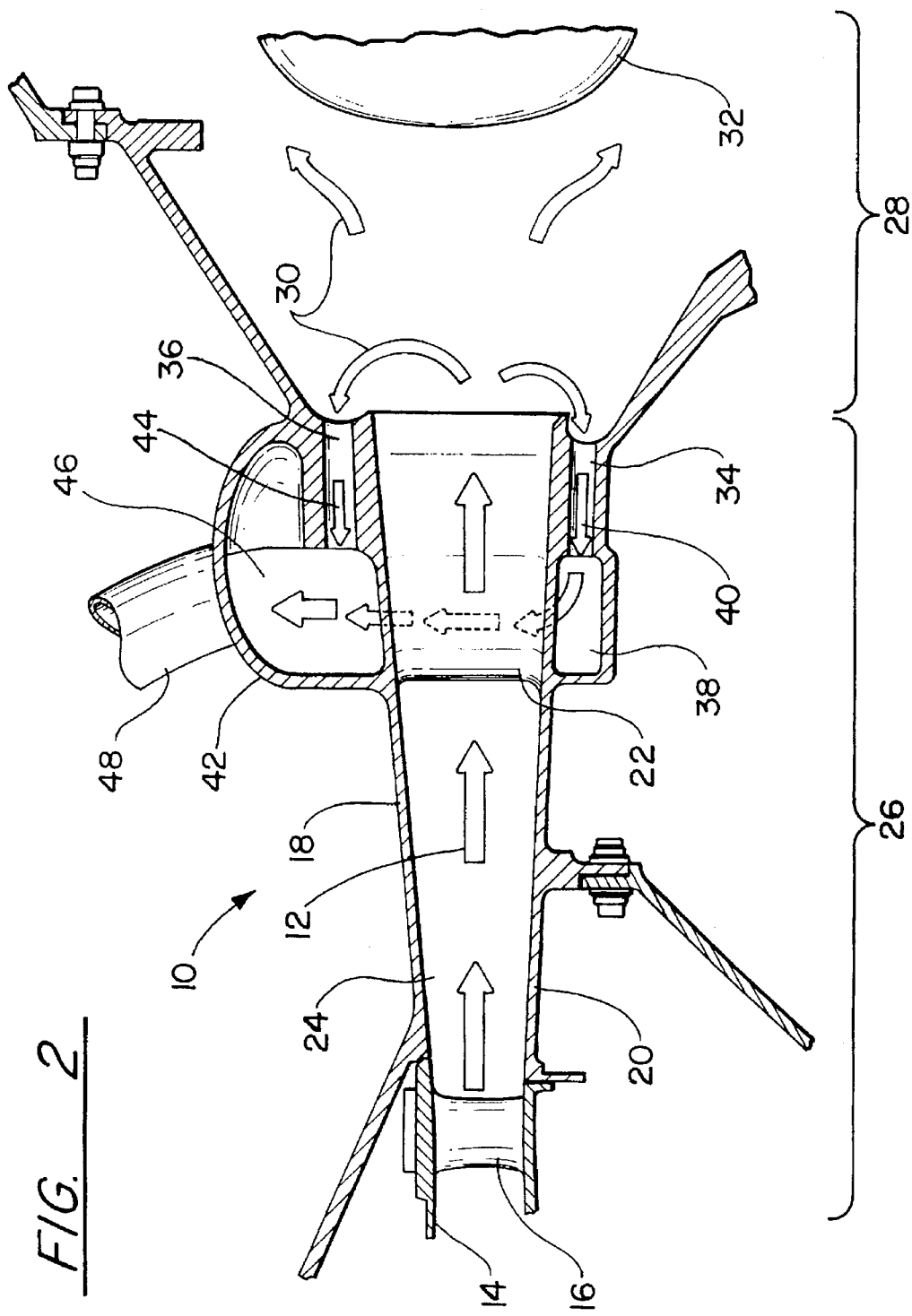
FIG. 2 is a cross section of a diffuser of the present invention.

According to the present invention and as shown in FIG. 2, a gas turbine engine has an annular compressed airflow path 12. The compressed air 12 from an upstream compressor section 14 passes between a plurality of compressor exit guide vanes 16 into a diffuser case 10. The diffuser 10 comprises an outer wall 18, an inner wall 20, where the walls are coaxially and divergingly aligned defining an annular passageway 24, and a plurality of struts 22 that each have an internal passageway. The struts 22 connect the walls 18 and 20. The walls 18 and 20 diverge and define a first diffuser region 26 for the compressed airflow path 12. Downstream of the struts 22, the walls 18 and 20 diverge with a larger angle relative to the first diffuser region 26 to define a second diffuser region 28. The compressed air 12 flows past the struts 22 and into the second diffuser region 28 where the compressed air 12 further diffuses, slowing in velocity and increasing in static pressure to become diffused air 30. A major portion of the diffused air 30 flows to a combustor region 32 and then to a turbine region (not shown), an inner portion of diffused air 30 flows into a plurality of internal discharge orifices 34, and an outer portion of diffused air 30 flows into a plurality of external discharge orifices 36. The orifices 34 and 36 are located in the second diffuser region and are radially internal and external of the compressed air 12 direct flow path.

A plenum 38 is located radially internal of the annular airflow path. The internal orifices 34, the plenum 38, and the strut internal passageways connect to define a plurality of first passageways 40 for the flow of diffused air to a manifold 42. The manifold 42 is located externally external of the airflow path.

The plenum 38 may be one continuous annular plenum that accepts diffused air from the internal orifices or may be several individual plenums adjacent to one or more inside orifices 34. The internal orifices 34 supply diffused air 30 to the plenum 38, which pressurizes the plenum 38. This inner portion of diffused air 30 in the plenum 38 is delivered to the manifold 42 from the plenum 38 through the struts 22. The external orifices 36 connect with the manifold 42 to define a plurality of second passageways 44 for the flow of diffused air. The second diffuser region 28 is pressurized when the compressed air 12 diffuses, then the outer portion of the diffused air flows into lower pressure areas, such as the manifold 42 via the first and second passageways 40 and 44. The accumulated diffused air, or discharge air, in the manifold 42 is available service application air 46 to be used for engine or aircraft accessories. As the service application air 46 is needed, it is discharged from the manifold 42 through tubing 48.

The present invention diffuser 10 described herein efficiently increases the amount of available discharged air 46 compared to the enlarging the discharge orifices of the prior art diffusers, because the orifices 34 and 36 are located in the second diffused region 28 where the diffused air is at a higher static pressure relative to the compressed air 12 and the first diffuser region 26.

The airflow into the second diffuser region 28 and the combustor region 32 is interrupted by the struts 22. The interruption of airflow into the combustor may allow some areas of the prior art combustors to be cooled more than others, which causes the less cooled areas to approach design limits resulting in "hot spots". The present invention includes orifices internal and external to the annular airflow path that may be manufactured to predetermined sizes to control the discharge rate of the diffused air 30 through the orifices 34 and 36 and, therefore, influence the downstream cooling airflow. A geometric relation may be developed between the number, location, and size of the struts and the number, location, and size of the orifices in relation to the downstream cooling airflow to evenly distribute cooling air to the combustor. The geometric relation between the elements may be determined based on engine test data to direct diffused airflow to combustor areas that need more cooling air. A large orifice would increase the flow of the diffused air into the manifold area and decrease the amount of available downstream cooling air in that particular orifice area for a combustor. A small orifice would decrease the flow of the diffused air into the manifold area and increase the amount of available cooling air in that particular orifice area for the combustor. The orifices are geometrically sized and located to radially and circumferentially control the flow of the diffused air 30 before the air enters the combustor region 32 to increase downstream cooling and to reduce "hot spots". The controlled discharge of diffused air 30 provides uniform cooling for downstream components, and in turn, reduces combustor and turbine thermal distortion and degradation.

Although this invention has been shown and described with respect to a detailed embodiment, those skilled in the art will understand that various changes in form and detail may be made without departing from the spirit and scope of the claimed invention.

We claim:

1. A diffuser case for a gas turbine engine to provide discharge air for engine service applications, comprising:

a first diffuser region having an outer wall and an inner wall diverging relative to each other defining an annular passage for the flow of compressed air;

struts extending between the walls, wherein each of the struts include an interior passageway;

a second diffuser region defined by the outer and inner walls diverging with respect to the airflow direction, the second diffuser region located downstream of the first diffuser region and upstream of the combustor, the second diffuser region further diffusing the compressed air, further decreasing the velocity and increasing the static pressure of the compressed air;

a plurality of discharge orifices located in the second diffuser region radially internal of and external of the annular airflow path, the orifices accepting diffused air from the second diffuser region;

a plenum located radially internal of the airflow path, said plenum surrounding the first diffuser region and being connected to the internal orifices for accepting diffused air from the internal orifices;

a manifold located radially external of the airflow path and connected to the external orifices;

the internal orifices connecting with the plenum, the plenum connecting with the struts to define a plurality of first passageways for flowing diffused discharge air to the manifold;

the external orifices connecting with the manifold defining a plurality of second passageways for flowing diffused discharge air to the manifold;

wherein the diffused air from the second diffuser region flows to the plenum and to the manifold, the manifold storing the diffused discharge air to be used for service applications.

2. The diffuser case of claim 1 wherein the diffuser case further includes a plurality of plenums, each plenum connecting to each internal orifice and each strut for accepting diffused air from each internal orifice defining a plurality of first passageways for flowing diffused discharge air to the manifold.

3. The diffuser case of claim 1, wherein the orifices are geometrically sized and spaced to control the flow of the diffused air and downstream cooling uniformity.

4. The diffuser case of claim 1 wherein the outer and inner walls are coaxially aligned and diverging relative to each other defining an annular passage for the flow of compressed air.

5. A method of discharging air from a gas turbine engine and of providing cooling air downstream of the discharge site, the method comprising:

diffusing the compressed air in a first diffuser region so that the air has a higher static pressure relative to the compressed air;

further diffusing the compressed air in a second diffuser region, further decreasing the velocity and increasing the static pressure of the compressed air;

discharging the high static pressure air radially internal of and external of the annular passage flow path into a plurality of discharge orifices;

providing passageways for flowing the discharged air from the discharge orifices to a manifold.

6. The method of claim 5, wherein the method further comprises:

cooling the downstream components by influencing the downstream cooling airflow with the plurality of discharge orifices, the orifices being geometrically sized and spaced to control the flow of the diffused air and downstream cooling uniformity.

\* \* \* \* \*